United States Patent [19]

Snyder, Jr. et al.

[11] Patent Number: 4,702,854

[45] Date of Patent: Oct. 27, 1987

[54] WATER-BASED HYDRAULIC FLUIDS COMPRISING POLY-OXAZINES OR POLY-OXAZOLINES

[75] Inventors: Kenneth L. Snyder, Jr.; Syamalarac Evani, both of Midland, Mich.

[73] Assignee: The Dow Chemical Company, Midland, Mich.

[21] Appl. No.: 490,938

[22] Filed: May 2, 1983

[51] Int. Cl.$^4$ .............. C10M 105/00; C10M 105/08; C10M 105/70

[52] U.S. Cl. ............................. 252/75; 252/32.7 E; 252/49.3; 252/51.5 R; 252/77; 252/73

[58] Field of Search .................... 252/75, 73, 77, 49.3, 252/51.5 R, 32.7 E

[56] References Cited

U.S. PATENT DOCUMENTS

| | | | |
|---|---|---|---|
| 2,897,182 | 7/1959 | de Benneville et al. | 252/51.5 R |
| 2,905,644 | 9/1959 | Butter | 252/51.5 R |
| 3,483,141 | 12/1969 | Litt et al. | 260/2 |
| 4,144,211 | 3/1979 | Chamberlin et al. | 260/29.2 R |
| 4,224,172 | 9/1980 | Schmitt et al. | 252/51.5 R |
| 4,253,982 | 3/1981 | Bridger et al. | 252/51.5 R |
| 4,277,353 | 7/1981 | Deen et al. | 252/51.5 R |
| 4,375,417 | 3/1983 | Zoleski et al. | 252/51.5 R |
| 4,386,001 | 5/1983 | Zoleski et al. | 252/51.5 R |
| 4,469,611 | 9/1984 | Snyder, Jr. et al. | 252/75 |
| 4,474,928 | 10/1984 | Hoenig et al. | 428/483 X |

FOREIGN PATENT DOCUMENTS 0001492 4/1979 European Pat. Off. .
2094796 9/1982 United Kingdom .

*Primary Examiner*—John E. Kittle
*Assistant Examiner*—Mukund J. Shah

[57] ABSTRACT

Substantially oil-free aqueous industrial fluids possess superior lubricating and wear preventing characteristics and are useful as hydraulic fluids and metalworking compositions. Fluids of the invention comprise (1) an aqueous liquid and (2) a water-soluble synthetic addition copolymer of a poly-2-oxazoline or a poly-2-oxazine.

The industrial fluids exhibit good Newtonian behavior and mechanical stability at high shear.

17 Claims, No Drawings

WATER-BASED HYDRAULIC FLUIDS COMPRISING POLY-OXAZINES OR POLY-OXAZOLINES

BACKGROUND OF THE INVENTION

This invention relates to water-based hydraulical and metalworking fluids, in particular those fluids which are thickened with a polymeric thickening agent.

Petroleum oils have traditionally been used as hydraulic fluids. Such oils exhibit good Newtonian viscosity behavior. A Newtonian fluid is a fluid that possesses a viscosity which is independent of the velocity gradient. Thus, the shear stress ($\tau$) is related to the shear rate ($\dot{\gamma}$) by the equation:

$$\tau = \eta\dot{\gamma}$$

wherein $\eta$ is the shear rate independent viscosity. Further, petroleum oils have a viscosity that is fairly constant throughout the lifetime of the fluid at prolonged high shear rates. This mechanical stability to shear degradation is a desired property of hydraulic fluids. The shear stable Newtonian viscosity of a typical hydraulic oil is generally in the range of 10 to 100 centistokes at 100° F.

Water-based lubricant products are gaining popularity due to shortages of petroleum base supplies, environmental concerns caused by problems in disposing of oil-based wastes, cost incentives and fire safety considerations. Typically, a water-based hydraulic fluid consists of several water-soluble or emulsifiable additives such as corrosion inhibitors (alkanolamines), lubricity aids (long chain carboxylic acid salts) and/or extreme pressure additives (zinc dialkyldithiophosphates, phosphate esters, borates, etc.). However, such an additive package has a viscosity that is essentially equal to that of water. It is desirable to thicken such a water-based lubricant with a substantially water-swellable thickening agent to overcome the problems associated with the use of a low viscosity fluid.

Increased viscosity of the water-based hydraulic fluids is desirable for several reasons. In particular, thickened fluid can aid in the operation of system valves which have been designed to work specifically with oil-based fluids. Further, thickened fluids are less prone to experience leaking though small holes or cracks in the hydraulic system. Higher pump efficiencies are obtainable with thickened fluids, especially at high loads, and such fluids exhibit wear prevention characteristics in both hydrodynamic and elastohydrodynamic wear modes. It is desirable to provide a viscosity which is relatively constant throughout the lifetime of the fluid and relatively constant at varying shear rates.

For water-based hydraulic fluids, a polymer solution having a mechanically stable viscosity of about 10 to about 100 centistokes at 100° F. and a viscosity independent of shear rate at shear rates approaching up to about $10^6 \sec^{-1}$ is desirable. One way of describing the viscosity dependence on shear rate is through the use of the Power Law:

$$\ln \tau = N \ln \dot{\gamma} + \ln K.$$

Here, the shear stress ($\tau$) is found to vary in a nonlinear manner with shear rate ($\dot{\gamma}$). Thus, the viscosity changes with changes in shear rate. N is a measure of the extent of deviations from Newtonian behavior. A Power Law N value of 1.0 indicates a Newtonian fluid. Anything less than 1.0 is said to be shear-thinning. The K value relates to the fluid viscosity at a shear rate of 1 $\sec^{-1}$. Further, for the sake of economic efficiency, it is desirable to keep the polymer concentration as low as possible. However, it is not always possible to provide a polymer system that exhibits a desired, mechanically stable hydrodynamic size and the desired Newtonian viscosity while maintaining a high polymer thickening efficiency.

Water-soluble polymers can be made in a variety of physical structures and molecular weights. High molecular weight linear polymers are highly efficient thickeners. However, such polymers exhibit non-Newtonian viscosity behavior and suffer from mechanical degradation at high shear rates. Reduction in molecular weight of the linear polymers increases the Newtonian character and mechanical stability of the thickener. Unfortunately, such low molecular weight polymers require high concentrations to thicken the fluid and thus are not economical.

It is desirable to produce compositions which, at low concentrations, exhibit a substantial thickening effect on the water in the aqueous hydraulic systems formed thereby, and provide the aqueous system with high viscosity and enhanced shear stability. It is also desirable that the viscosities in the aqueous hydraulic fluid systems employing the thickeners approach the viscosities of oil-based hydraulic systems, i.e., about 10 to about 100 centistokes at 100° F.

SUMMARY OF THE INVENTION

This invention is a substantially oil-free hydraulic fluid or metalworking composition which maintains a Newtonian shear stable viscosity comprising an aqueous liquid and a functionally effective amount of a poly-2-oxazine or a poly-2-oxazoline. As used herein, the term "aqueous liquid" means water or an aqueous solution comprising additives commonly employed in aqueous hydraulic fluids, such as corrosion inhibitors, anti-wear agents, etc.

The hydraulic fluids and metalworking compositions of the present invention exhibit excellent lubricity and anti-wear characteristics, and are useful as coolants and lubricants of surfaces which are in frictional contact such as during operations of turning, cutting, peeling, grinding metals and the like. Such fluids and compositions are easily prepared, exhibit the desirable viscosities of oil-based hydraulic systems and maintain a relatively constant viscosity (i.e., provide a Newtonian shear stable viscosity) at high shear. As used herein, "high shear" means a shear rate of greater than about 1000 $\sec^{-1}$. The thickening ability of the polymeric thickeners provides a fluid with a desirable viscosity which yields superior pump efficiency and improved leakage reduction. Such fluids can offer improved performance at high loads. The hydraulic fluids and metalworking compositions are ecologically superior to those fluids and metalworking emulsions of the prior art containing petroleum oils, mineral oils or glycol/water mixtures.

DETAILED DESCRIPTION OF THE INVENTION

The poly-2-oxazolines are known compounds which are typically prepared from 2-oxazoline monomers corresponding to the formula:

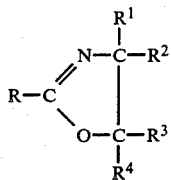

wherein R and $R^1$-$R^4$ are independently hydrogen, alkyl, aralkyl, aryl or inertly substituted aryl. The individual substituents represented by R and $R^1$-$R^4$ which can be employed herein are those which, when polymerized, yield a polymer which is sufficiently water soluble to adequately thicken the aqueous liquid. The poly-2-alkyloxazolines are preferred. Most preferably, R is ethyl and $R^1$-$R^4$ are hydrogen.

The poly-2-oxazines are known compounds which are typically prepared from 2-oxazine monomers corresponding to the formula:

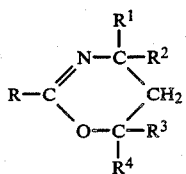

wherein R and $R^1$-$R^4$ are as previously defined. The poly-2-alkyloxazines are preferred. Most preferably, R is ethyl and $R^1$-$R^4$ are hydrogen. Exemplary monomers are disclosed in U.S. Pat. Nos. 3,483,141 and 4,144,211 which are incorporated herein by reference.

Methods of preparation of the poly-2-oxazolines and poly-2-oxazines are disclosed in the aforementioned U.S. Pat. No. 3,483,141. In particular, the aforementioned monomers are heated in the presence of a catalyst such as methyl iodide or boron trifluoride to yield a polymer comprising recurring units of the formula:

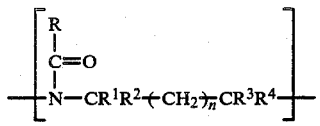

wherein R and $R^1$-$R^4$ are as defined hereinbefore, and n is 0 or 1. The molecular weight of polymers so prepared can range from 200,000 to about 2,000,000. However, polymers of molecular weights of from about 400,000 to about 750,000 are preferred. Polymers of high molecular weight are less preferred as they are extremely pseudoplastic and exhibit poor Newtonian behavior. It is also possible to obtain polymers containing small amounts of crosslinking through hydroxyl substituted portions of the oxazine or oxazoline. Such technology is taught in the *Journal of Polymer Science*, Pt. A-1, Vol. 6, pp. 1883–1894 (1968). Similarly, the rheological properties of the poly-2-oxazolines and poly-2-oxazines can be further improved by preparing polymers in the form of a "star" or "branched" geometry, in addition to the linear structure. Such polymers can be synthesized from a polyglycerol initiator which has been modified to yield the appropriate multi-toyslate functionality. It is believed that said species will be more Newtonian and more shear stable than linear polymeric thickeners.

The polymeric thickeners of the present invention are capable of thickening an aqueous liquid to provide the resulting fluid with a viscosity comparable to that of oil-based hydraulic fluids. By the term "thicken" is meant that the viscosity of the liquid is measurably increased upon the addition of the polymeric thickener thereto, when said viscosities are measured using conventional techniques such as with a Brookfield viscometer. The specific amount of polymer present as a thickener in aqueous media will depend on a variety of factors including the end use application, and the amount and composition of thickener employed. The polymers of this invention have high thickening ability at low concentrations in an aqueous liquid, and maintain their good thickening ability even after prolonged service at high rates of shear. The good shear stability makes the polymers of this invention more suitable than conventional linear polymers which are used as thickeners in hydraulic fluid or metalworking applications. The good mechanical stability and good Newtonian behavior of the polymer, when formulated in an aqueous liquid, is believed to be a result of the relatively high density of the polymer for its hydrodynamic volume. That is, it is difficult to deform a polymer which is relatively massive for its volume. It is also believed that the polymeric thickeners of this invention provide improved thermal stability to a hydraulic fluid or metalworking composition as compared to other polymeric thickeners known in the art.

In one sense, the hydraulic fluids and metal-working compositions of the invention comprise a functionally effective amount of a polymeric thickener formulated with an aqueous liquid to give the desired balance of properties for the desired application. While any functionally effective amount of fluid can be employed, said fluids and compositions generally comprise from about 85 percent to about 99.9 weight percent aqueous liquid and from about 0.1 percent to about 15 weight percent polymeric thickener. These aqueous liquids comprise water and optional additives such as other thickening agents, defoamers, corrosion inhibitors and metal deactivators, chelating agents, or surfactants which can modify the cloud point of the thickened formulation. Preferably, said formulations comprise about 0.5 to about 10 weight percent polymeric thickener and about 90 to about 99.5 percent aqueous liquid. The fluids are easily formulated at room temperature using distilled or deionized water although tap water can also be used without adverse effects on the fluid properties.

Additives common to hydraulic or metalworking fluids may be added to the thickened compositions without hindering the desired properties of the hydraulic fluid or metalworking composition. For example, small amounts of corrosion inhibitors such as alkali metal nitrites, nitrates, phosphates, silicates and benzoates may be added as liquid-vapor phase corrosion inhibitors. Representative suitable organic corrosion inhibitors include hydrocarbyl amine and hydroxy-substituted hydrocarbyl amine neutralized acid compound, such as neutralized phosphates and hydrocarbyl phosphate esters, neutralized fatty acids (e.g., those having 8 to about 22 carbon atoms), neutralized aromatic carboxylic acids (e.g., 4-(t-butyl)benzoic acid), neutralized naphthenic acids and neutralized hydrocarbyl sulfonates. Mixed salt esters of alkylated succinimides are also useful. Particularly useful amines include the alkanolamines such as ethanolamine, diethanolamine, triethanolamine and the corresponding propanolamines.

Other amine-type corrosion inhibitors are morpholine, ethylenediamine, N,N-diethylethanolamine, alpha- and gamma-picoline, piperazine and isopropylaminoethanol. Other additives include colorants; dyes; deodorants such as citronella; bacteriacides and other antimicrobials; water softeners such as an ethylene diamino tetraacetate sodium salt or nitrilo triacetic acid; antifreeze agents such as ethylene glycol and analogous polyxoyalkylene polyols; anti-foamants such as silicone-containing agents and shear stabilizing agents such as commercially available polyoxyalkylene polyols. For example, formulations comprising from about 0.1 to about 15 weight percent polymeric thickener, from about 0 to about 30 weight percent ethylene glycol and about 55 to about 99.9 weight percent aqueous liquid can be prepared. Such formulations exhibit an expanded functionally effective temperature range and shear stable viscosities at higher and lower temperatures in systems containing increasing amounts of ethylene glycol. Anti-wear agents, friction modifiers, anti-slip and lubricity agents may also be added. Such agents include metal or amine salts of an organo sulfur, phosphorus, boron or carboxylic acid which is the same as or of the type as used in oil-based fluids. Typical of such salts are carboxylic acids of 1 to 22 carbon atoms including both aromatic and aliphatic acids; sulfur acids such as alkyl and aromatic sulfonic acids and the likel; phosphorus acids such as phosphoric acid, phosphorous acid, phosphinic acid, acid phosphate esters, and analogous sulfur homologs such as the thiophosphoric and dithiophosphoric acid and related acid esters; mercaptobenzothiozole; boron acids include boric acid, acid borates and the like. Useful functional additives also include lubricity aids such as metal dithiocarbamates including molybdenum and antimony dithiocarbamates; as well as dibutyltin sulfide, tributyltin oxide, phosphates and phosphites; borate amine salts, chlorinated waxes; trialkyltin oxide, molybdenum phosphates and chlorinated waxes. Extreme pressure additives include phosphate esters and zinc dialkyl dithiophosphate. Low foaming surfactants and dispersants are also desirable additives, especially for uses at temperatures greater than about 50° C.

It should also be noted that many of the ingredients described above for use in making the substantially oil-free hydraulic fluids and metalworking compositions of this invention are industrial products which impart more than one property to the composition. Thus, a single ingredient can provide several functions thereby eliminating or reducing the need for some other additional ingredient. Thus, for example, a dispersing agent may also serve in part as an inhibitor of corrosion. Similarly, a lubricity agent such as tributyltin oxide can also function as a bactericide. In addition, lauric acid, when employed in small amounts as a lubricity aid, may also act as a viscosity enhancing agent.

The hydraulic fluid and metalworking compositions of this invention, when formulated as taught above, are transparent or slightly turbid liquids having a viscosity of up to about 500 centipoises at 100° F., which are stable over long periods of storage at ambient temperature. Most preferably, hydraulic fluids and metalworking compositions of this invention are formulated such that the viscosity is between about 10 and about 100 centipoises, preferably about 20 to about 40 centipoises at 100° F. In addition, the hydraulic fluids and metalworking additives of the invention are substantially oil-free and will not support combustion in contrast to those fluids of the prior art based on petroleum oils. The hydraulic fluids and metalworking additives of the invention are ecologically clean and nonpolluting compositions when compared to existing petroleum-based hydraulic fluids. Since the hydraulic fluid and metalworking additives of the invention are largely based upon materials which are not derived from petroleum, the production of such fluids is relatively independent of shortages of petroleum oil and not materially influenced by the economic impact of such shortages.

The hydraulic fluids of the invention can be used in various applications requiring hydraulic pressures in the range of up to about 2,000 pounds per square inch since they have all the essential properties such as lubricity, viscosity and corrosion protection. The hydraulic fluids of the invention are suitable for use in various types of hydraulic systems and are especially useful in systems in which vane-type pumps or the axial-piston pumps are used. Such pumps are used in hydraulic systems where pressure is required for molding, clamping, pressing metals, actuating devices such as doors, elevators and other machinery or for closing dies in die-casting machines and in injection molding equipment and other applications.

The hydraulic fluids and metalworking compositions of the present invention can be used in methods for shaping solid material with a work tool by lubricating the tool and/or the material. These shaping processes comprise cutting, grinding, drilling, punching, stamping, turning, lapping, polishing, rolling, drawing and combinations of said processes. Often the solid material is a metal work piece or it may be earth, rock, sand, concrete or a mixture of these. When the work piece is metal, it can comprise at least one ferrous or at least one nonferrous metal or a combination of both. When the material is earth, rock, sand, concrete, cement or a mixture of these, the tool is often a drill of rotary or precussion-type and the earth, rock, sand, concrete, cement or a mixture of same, overlies a naturally occuring deposit, such as a deposit of fossil fuel, an ore body, or an economically valuable mineral such as gem stones and the like.

The following examples are given to further illustrate the invention and should not be considered as limiting the scope thereof. All percentages are in weight percent unless otherwise noted.

EXAMPLE 1

Hydraulic fluid formulations are prepared as follows.

A poly-2-ethyloxazoline as described above is mixed with deionized water to yield a formulation which is 8 percent polyethyloxazoline and 92 percent of an aqueous liquid. The aqueous liquid comprises 1.08 percent diethylethanolamine, 0.51 percent lauric acid, 0.61 percent morpholine, 0.17 percent sodium mercaptobenzothiazol, 500 ppm Dow Corning Antifoam DB-110A, 26.6 percent ethylene glycol and about 63 percent water. This formulation is designated as Sample No. 1.

A poly-2-ethyloxazoline as described above is mixed with ethylene glycol and deionized water to yield a formulation which is 8 percent polyethyloxazoline, 8.7 percent ethylene glycol and 83.3 percent of an aqueous liquid. The aqueous liquid comprises the additives listed in Example 2 except that 35.3 percent ethylene glycol and about 54.3 percent water are employed. This formulation is designated as Sample No. 2.

A commercially available polyglycol thickened hydraulic fluid comprising greater than about 16 percent polymeric thickener is designated as Sample No. C-1.

The viscosities of the aforementioned samples are measured at various rates of shear using a Haake NV system at 50° C. The results are presented in Table I.

TABLE I

| $\dot{\gamma}(\sec^{-1})$ | Viscosities (cP) | | |
|---|---|---|---|
| | Sample No. 1 | Sample No. 2 | Sample No. C-1* |
| 345 | 41.1 | 48.5 | 20.5 |
| 690 | 41.5 | 49.0 | 20.3 |
| 1380 | 40.8 | 48.5 | 20.5 |
| 2760 | 40.0 | 48.8 | 20.5 |

*Not an example of the invention.

The data in Table I indicates that the polyethyloxazoline hydraulic fluid formulations (Sample Nos. 1 and 2) lose very litte viscosity upon undergoing an increase in shear rate which compares to the commercially available fluid which contains roughly twice as much polymeric thickener. This indicates good Newtonian behavior of Sample Nos. 1 and 2.

EXAMPLE 2

A poly-2-ethyloxazoline having a weight average molecular weight of 491,000 as determined by aqueous size exclusion chromatography is mixed with deionized water and other additives to yield a hydraulic fluid formulation. The formulation comprises 7.5 percent polyethyloxazoline, 0.5 percent lauric acid, 500 ppm Dow Corning Antifoam DB-110A, about 92 percent deionized water and enough sodium hydroxide to raise the pH of the formulation to about 10. The viscosity of said formulation at 25° C. is 52 centipoises as measured using a Haake Rotoviscometer. The formulation gives 13 milligrams of wear after being tested at 25° C. under a 400 pound load, at 1000 rpm for 100 minutes as measured using a Falex simulated vane pump test on a Falex Model 6 Friction and Wear Tester. The formulation is subjected to high shear for 30 minutes in a Waring Blender and is observed to undergo no viscosity loss, indicating good degradation stability.

For comparison purposes a formulation is prepared which comprises 0.5 percent lauric acid, 500 ppm antifoam, about 99.5 percent deionized water and enough sodium hydroxide to raise the pH of the formulation to about 10. The viscosity of said formulation at 25° C. is 1 centipoise as measured using a Haake Rotoviscometer. The formulation gives 13 milligrams of wear after being tested as described hereinbefore.

This indicates that the thickener has no negative effects upon wear performance, yet because of its thickening ability, it provides a fluid with a high viscosity which yields superior pump efficiency and leakage reduction. Such fluids can also offer improved performance at higher loads.

What is claimed is:

1. A substantially oil-free hydraulic fluid or metalworking composition which maintains a substantially Newtonian and shear stable viscosity comprising an aqueous liquid containing a lubricity aid and a functionally effective amount of a poly-2-oxazine or a poly-2-oxazoline.

2. A hydraulic fluid or metalworking composition of claim 1 wherein said poly-2-oxazoline is poly-2-ethyloxazoline.

3. A hydraulic fluid or metalworking composition of claim 1 wherein said aqueous liquid contains an antifoaming agent.

4. A hydraulic fluid or metalworking composition of claim 1 wherein said aqueous liquid contains a corrosion inhibitor.

5. A hydraulic fluid or metalworking composition of claim 1 wherein said aqueous liquid contains an extreme pressure additive.

6. A hydraulic fluid or metalworking composition of claim 1 wherein said poly-2-oxazine or poly-2-oxazoline is a polymer comprising recurring units of the formula:

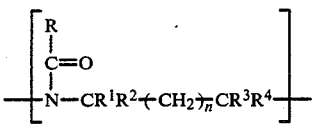

wherein R and $R^1$-$R^4$ are independently hydrogen, alkyl, aralkyl, aryl or inertly substituted aryl, and n is 0 or 1.

7. A hydraulic fluid or metalworking composition of claim 1 wherein said aqueous liquid contains a surfactant to modify the cloud point of the formulation.

8. A hydraulic fluid or metalworking composition of claim 1 wherein said poly-2-oxazine or poly-2-oxazoline is prepared in the form of a star, branched or linear structure.

9. A hydraulic fluid or metalworking composition of claim 1 wherein the molecular weight of said poly-2-oxazine or poly-2-oxazoline ranges from about 200,000 to about 2,000,000.

10. A hydraulic fluid or metalworking composition of claim 1 wherein the molecular weight of said poly-2-oxazine or poly-2-oxazoline ranges from about 400,000 to about 750,000.

11. A process for providing a water-based hydraulic fluid or metalworking composition having a viscosity comparable to that of an oil-based hydraulic fluid comprising contacting an aqueous liquid containing a lubricity aid with a functionally effective amount of a poly-2-oxazine or a poly-2-oxazoline.

12. A hydraulic fluid or metalworking composition of claim 1 wherein the viscosity of said composition approaches that of an oil-based hydraulic fluid or metalworking composition.

13. A hydraulic fluid or metalworking composition to claim 1 having a viscosity of from about 10 to about 100 cps at 100° F.

14. A process of claim 11 wherein said poly-2-oxazoline is poly-2-ethyloxazoline.

15. A process of claim 11 wherein the molecular weight of poly-2-oxazine or poly-2-oxazoline ranges from about 200,000 to about 2,000,000.

16. A process of claim 11 wherein said poly-2-oxazine or poly-2-oxazoline comprises recurring units of the formula:

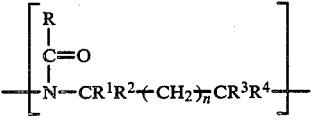

wherein R and $R^1$-$R^4$ are independently hydrogen, alkyl, aralkyl, aryl or inertly substituted aryl, and n is 0 or 1.

17. A process of claim 11 wherein said viscosity ranges from about 10 to about 100 cps at 100° F.

* * * * *